US012326017B2

(12) United States Patent
Xu

(10) Patent No.: US 12,326,017 B2
(45) Date of Patent: Jun. 10, 2025

(54) VEHICLE DOOR LOCK CAPABLE OF ASSISTING DOOR OPENING

(71) Applicant: Magna Automotive Parts (Suzhou) Co., Ltd., Jiangsu (CN)

(72) Inventor: Ying Qing Xu, Suzhou (CN)

(73) Assignee: Magna Automotive Parts (Suzhou) Co., Ltd., Jiangsu (CN)

( * ) Notice: Subject to any disclaimer, the term of this patent is extended or adjusted under 35 U.S.C. 154(b) by 497 days.

(21) Appl. No.: 17/715,141

(22) Filed: Apr. 7, 2022

(65) Prior Publication Data

US 2022/0349217 A1 Nov. 3, 2022

(30) Foreign Application Priority Data

Apr. 8, 2021 (CN) ......................... 202110378701.9

(51) Int. Cl.

| | |
|---|---|
| ***E05B 81/20*** | (2014.01) |
| ***E05B 77/34*** | (2014.01) |
| ***E05B 81/04*** | (2014.01) |
| ***E05B 81/18*** | (2014.01) |
| ***E05B 81/56*** | (2014.01) |
| ***E05B 81/66*** | (2014.01) |

(Continued)

(52) U.S. Cl.

CPC .............. *E05B 77/34* (2013.01); *E05B 81/05* (2013.01); *E05B 81/18* (2013.01); *E05B 81/20* (2013.01); *E05B 81/56* (2013.01); *E05B 81/66* (2013.01); *E05B 83/36* (2013.01); *E05B 85/26* (2013.01)

(58) Field of Classification Search

CPC .......... E05B 79/20; E05B 81/05; E05B 81/18; E05B 81/20; E05B 81/25; E05B 81/56; E05B 81/66; E05B 77/34; E05B 77/36; E05B 77/40; E05B 83/36; E05B 85/26

See application file for complete search history.

(56) References Cited

U.S. PATENT DOCUMENTS 4,872,714 A 10/1989 Brusasco
5,328,219 A * 7/1994 Konchan ................ E05B 77/40 292/216
5,899,508 A 5/1999 Cetnar et al.

(Continued)

FOREIGN PATENT DOCUMENTS

CA 2264668 A1 2/1998
CA 2455243 A1 1/2004

(Continued)

*Primary Examiner* — Kristina R Fulton
*Assistant Examiner* — Noah Horowitz
(74) *Attorney, Agent, or Firm* — Dickinson Wright PLLC

(57) ABSTRACT

A vehicle door lock is disposed in a vehicle door and includes a ratchet wheel rotatable between a locked position where it captures a lock catch disposed on a vehicle body and an unlocking position where it releases the lock catch to allow the vehicle door to be opened. The vehicle door lock further includes an ice-breaking mechanism disposed in the vehicle door, and the ice-breaking mechanism applies a torque to the ratchet wheel to cause the ratchet wheel to rotate in a direction to push the lock catch so as to open the vehicle door. The vehicle door lock can be opened by pushing the ratchet wheel with e ice-breaker mechanism when the vehicle door is frozen or deformed due to collision, the operation noise is low, the cost is low, and the paint surface of the vehicle door is protected.

10 Claims, 5 Drawing Sheets

(51) Int. Cl.

| | |
|---|---|
| ***E05B 83/36*** | (2014.01) |
| *E05B 85/26* | (2014.01) |

(56) References Cited

U.S. PATENT DOCUMENTS

| | | | | |
|---|---|---|---|---|
| 6,341,448 | B1 | 1/2002 | Murray et al. | |
| 6,588,829 | B2 | 7/2003 | Long et al. | |
| 6,715,808 | B2 | 4/2004 | Oxley et al. | |
| 6,848,727 | B1 | 2/2005 | Cetnar et al. | |
| 7,175,212 | B2 | 2/2007 | Cetnar et al. | |
| 7,175,228 | B2 | 2/2007 | Mrkovic et al. | |
| 7,261,334 | B2 | 8/2007 | Oberheide et al. | |
| 7,472,628 | B2 | 1/2009 | Oberheide | |
| 7,503,598 | B2 * | 3/2009 | Graute | E05B 77/38 292/201 |
| 7,540,551 | B2 | 6/2009 | Oberheide | |
| 7,731,000 | B2 | 6/2010 | Oh et al. | |
| 7,784,860 | B2 | 8/2010 | Schacht et al. | |
| 8,567,129 | B2 * | 10/2013 | Suzuki | E05B 81/20 49/506 |
| 9,428,943 | B2 | 8/2016 | Mitchell et al. | |
| 9,920,556 | B2 | 3/2018 | Byun et al. | |
| 10,087,671 | B2 * | 10/2018 | Linden | E05B 81/56 |
| 10,378,252 | B2 | 8/2019 | Ottino et al. | |
| 10,465,425 | B2 | 11/2019 | Clark et al. | |
| 10,590,682 | B2 | 3/2020 | Chevalier | |
| 10,647,183 | B2 | 5/2020 | Magazzini et al. | |
| 10,711,504 | B2 | 7/2020 | Roos et al. | |
| 10,767,397 | B2 | 9/2020 | Ottino et al. | |
| 11,008,797 | B2 | 5/2021 | Termine et al. | |
| 11,078,691 | B2 | 8/2021 | Salter et al. | |
| 11,199,031 | B2 | 12/2021 | Wirths | |
| 11,220,853 | B2 | 1/2022 | Cumbo | |
| 11,274,477 | B2 * | 3/2022 | Cumbo | E05B 81/20 |
| 11,377,880 | B2 * | 7/2022 | Mihail | B60N 2/01583 |
| 11,674,338 | B2 * | 6/2023 | Tomaszewski | E05B 81/68 292/201 |
| 11,697,952 | B2 * | 7/2023 | Ottino | E05F 1/105 49/139 |
| 12,044,043 | B2 * | 7/2024 | Jeong | E05B 81/18 |
| 2010/0117379 | A1 | 5/2010 | Mitchell et al. | |
| 2016/0186468 | A1 | 6/2016 | Ilea | |
| 2017/0089103 | A1 | 3/2017 | Ottino et al. | |
| 2017/0089105 | A1 | 3/2017 | Margheritti | |
| 2017/0107747 | A1 | 4/2017 | Dente et al. | |
| 2017/0306661 | A1 | 10/2017 | Kim et al. | |
| 2018/0051494 | A1 | 2/2018 | Scocco | |
| 2018/0087298 | A1 | 3/2018 | Strole et al. | |
| 2018/0100331 | A1 | 4/2018 | Cumbo | |
| 2018/0179788 | A1 | 6/2018 | Oxley et al. | |
| 2018/0320720 | A1 | 11/2018 | Erices et al. | |
| 2019/0003214 | A1 | 1/2019 | Cumbo et al. | |
| 2019/0017301 | A1 | 1/2019 | Cumbo | |
| 2019/0063117 | A1 | 2/2019 | Mozola | |
| 2019/0226247 | A1 | 7/2019 | Johann et al. | |
| 2019/0234122 | A1 | 8/2019 | Löw et al. | |
| 2019/0249468 | A1 | 8/2019 | Kim et al. | |
| 2019/0284849 | A1 | 9/2019 | Ilea et al. | |
| 2019/0292817 | A1 * | 9/2019 | Tomaszewski | E05B 79/20 |
| 2019/0292818 | A1 | 9/2019 | Cumbo | |
| 2019/0301212 | A1 | 10/2019 | Digel et al. | |
| 2019/0368237 | A1 | 12/2019 | Distefano et al. | |
| 2020/0080348 | A1 | 3/2020 | Cappelli et al. | |
| 2020/0108736 | A1 | 4/2020 | da Silva et al. | |
| 2020/0115932 | A1 | 4/2020 | Ottino et al. | |
| 2020/0131836 | A1 | 4/2020 | Ottino | |
| 2020/0284068 | A1 | 9/2020 | Cumbo et al. | |
| 2021/0222464 | A1 | 7/2021 | Oxley et al. | |
| 2021/0301561 | A1 | 9/2021 | Cumbo et al. | |

FOREIGN PATENT DOCUMENTS

| | | | | |
|---|---|---|---|---|
| CA | 2475746 | A1 | 7/2004 | |
| CN | 103255961 | A | 8/2013 | |
| CN | 105089383 | A | 11/2015 | |
| CN | 108979365 | A | 12/2018 | |
| CN | 109983190 | A | 7/2019 | |
| CN | 109983191 | A | 7/2019 | |
| CN | 110023574 | A | 7/2019 | |
| CN | 110023575 | A | 7/2019 | |
| CN | 110029905 | A | 7/2019 | |
| CN | 110036171 | A | 7/2019 | |
| CN | 110130754 | A | 8/2019 | |
| CN | 110273599 | A | 9/2019 | |
| CN | 110344679 | A | 10/2019 | |
| CN | 110359787 | A | 10/2019 | |
| CN | 110894764 | A | 3/2020 | |
| CN | 210370269 | U | 4/2020 | |
| CN | 210622543 | U | 5/2020 | |
| CN | 210622544 | U | 5/2020 | |
| CN | 111425084 | A | 7/2020 | |
| CN | 111456570 | A | 7/2020 | |
| CN | 111608503 | A | 9/2020 | |
| CN | 112211510 | A | 1/2021 | |
| CN | 113530381 | A | 10/2021 | |
| CN | 113846916 | A | 12/2021 | |
| CN | 113944382 | A | 1/2022 | |
| DE | 10242830 | A1 | 12/2003 | |
| DE | 10231825 | A1 | 4/2004 | |
| DE | 102006006191 | A1 | 8/2007 | |
| DE | 102014003737 | A1 | 9/2015 | |
| DE | 102018113335 | A1 | 3/2019 | |
| DE | 102019117125 | A1 | 1/2020 | |
| DE | 102019128986 | A1 | 5/2020 | |
| EP | 1153185 | A1 | 11/2001 | |
| EP | 1157182 | B1 | 8/2003 | |
| EP | 1257720 | B1 | 8/2005 | |
| EP | 2115253 | A1 | 11/2009 | |
| EP | 2373860 | A1 | 10/2011 | |
| JP | H049912 | B2 | 2/1992 | |
| KR | 20160088374 | A | 7/2016 | |
| WO | 03071064 | A1 | 8/2003 | |
| WO | 2011015497 | A1 | 2/2011 | |
| WO | WO-2011070858 | A1 * | 6/2011 | E05B 81/20 |
| WO | WO-2016090279 | A1 * | 6/2016 | E05B 77/36 |

* cited by examiner

VEHICLE DOOR LOCK CAPABLE OF ASSISTING DOOR OPENING

CROSS-REFERENCE TO RELATED APPLICATIONS

This application claims priority to and the benefit of previously filed Chinese Patent Application No. 202110378701.9, filed Apr. 8, 2021, the entire content of which is hereby incorporated by reference in its entirety.

TECHNICAL FIELD

The present invention relates to the technical field of closure panel locks such as vehicle door locks, and particularly to a vehicle door lock capable of assisting door opening.

BACKGROUND

Locking of vehicle closure panels, such as vehicle door locking of a vehicle, is generally realized by a vehicle door lock disposed in a closure panel or door of the vehicle and a lock catch disposed on a body of the vehicle. The vehicle door lock structure is generally in a form of a ratchet wheel and a ratchet pawl, that is, to maintain the vehicle door in an open state or a closed state by controlling the relative position of the ratchet wheel and the ratchet pawl.

Specifically, in the process of vehicle door closing, the lock catch (or striker) hits the ratchet wheel, such that the ratchet wheel rotates to capture the lock catch, in this process, the ratchet wheel obtains, by way of an external elastic member, potential energy that can drive it to rotate, and when the vehicle door reaches a closed position, the ratchet pawl can just stop the ratchet wheel, restrict the rotation of the ratchet wheel, and keep the vehicle door locked. An outer release mechanism (e.g., an outer door handle) or an inner release mechanism (e.g., an inner door handle) that can be used to open the vehicle door lock is connected to the ratchet pawl by a mechanical structure (typically a pull cable or a pull rod), thereby, the ratchet pawl is actuated to release the ratchet wheel, so that the ratchet wheel is rotated to realize the unlocking of the vehicle door lock.

Currently, vehicle door locks with an electric release function have been gradually applied to electric vehicle doors of passenger vehicles, and an electric release actuator equipped for an electric vehicle door is capable of actuating a ratchet pawl based on a release signal formed by human triggering to release a ratchet wheel so as to achieve vehicle door lock opening. However, when in extreme cold weather, the vehicle door and the vehicle door lock are frozen due to icing, or when the vehicle door is collided and deformed, the ratchet wheel cannot be rotated to fully release the lock catch, and the vehicle door cannot be electrically released, especially for a vehicle whose outer door handle is hidden, it is even more difficult to open the door of the vehicle by pulling the outer door handle.

To this end, some vehicles have accordingly been equipped with an ice-breaking mechanism. The ice-breaking mechanism is disposed on a vehicle door inner panel, and includes an ice-breaking ejector rod capable of extending out of the vehicle door inner panel, and an ice-breaking actuator for actuating the ice-breaking ejector rod to extend and retract. When the vehicle door and the vehicle door lock are frozen or stuck due to a deformation of the vehicle door, the ice-breaking actuator actuates the ice-breaking ejector rod to extend out of the vehicle door inner panel to push against the vehicle body in the reverse direction, thereby opening the vehicle door.

It will be understood that noise may be generated during the operation of the above-described ice-breaking mechanism, and the ice-breaking ejector rod may damage the paint surface of the portion (for example, the B-pillar) of the vehicle body against which the ice-breaking ejector rod pushes. Moreover, there is a potential safety hazard in the operation mode in which the ice-breaking ejector rod extends out of the vehicle door inner panel.

SUMMARY

One object of the present invention is to provide a vehicle door lock capable of assisting door opening, where the vehicle door lock can achieve opening of the vehicle door by pushing a ratchet wheel, has a low operating noise and a low cost, and does not damage a paint surface of a vehicle door.

To achieve this object, the present invention adopts technical solutions described in further detail below.

In one aspect, a vehicle door lock capable of assisting door opening is provided, where the vehicle door lock is fixed inside a vehicle door of a vehicle, and includes a ratchet wheel. The ratchet wheel is rotatable in a forward direction and a reverse direction to be respectively positioned in a locked position, where the ratchet wheel captures a lock catch disposed on a vehicle body of the vehicle to close the vehicle door, or in an unlocking position, where the ratchet wheel releases the lock catch to allow the vehicle door to be opened.

In one aspect, the vehicle door lock further includes an ice-breaking mechanism disposed inside the vehicle door, and the ice-breaking mechanism is capable of applying a torque to the ratchet wheel, to enable the ratchet wheel to rotate in the reverse direction to push against the lock catch to open the vehicle door.

Preferably, the ice-breaking mechanism is configured to apply a pulling force to a part of the ratchet wheel other than a rotating shaft of the ratchet wheel to form the torque for enabling the ratchet wheel to rotate in the reverse direction.

Preferably, the ice-breaking mechanism includes an actuator and an ice-breaking pull cable.

In one aspect, the actuator is fixed to the vehicle door.

In one aspect, the ice-breaking pull cable is connected between the ratchet wheel and the actuator to transmit the pulling force to the ratchet wheel when the actuator pulls the ice-breaking pull cable.

Preferably, the ice-breaking mechanism further includes a wheel rod pivotally coaxially coupled to the ratchet wheel and connected to the ice-breaking pull cable, where when the actuator pulls the wheel rod by the ice-breaking pull cable, the wheel rod is capable of, after rotating by a predetermined angle, abutting against the ratchet wheel in the locked position so as to drive the ratchet wheel to rotate in the reverse direction to the unlocking position while wheel rod further rotates.

Preferably, the vehicle door lock further includes a torsion spring configured to bias the ratchet wheel toward the unlocking position.

Preferably, the torsion spring is sleeved on the rotating shaft of the ratchet wheel, and two ends of the torsion spring are respectively connected to the ratchet wheel and the wheel rod so as to be able to reset the wheel rod.

Preferably, the ice-breaking mechanism further includes a cam pivotally coaxially coupled to the ratchet wheel, and the cam includes an insertion part and an abutting part.

The insertion part is inserted and connected to the ratchet wheel to enable the cam and the ratchet wheel to rotate synchronously.

The abutting part is arranged on a rotation path of the wheel rod to enable the wheel rod to push against the cam.

Preferably, the cam further includes a cam profile capable of triggering a micro switch when the ratchet wheel is in the unlocking position, where the micro switch is electrically connected to the actuator.

Preferably, the cam includes a metal body formed to have the insertion part and the abutting part and a plastic body formed to have the cam profile, where the plastic body is over-molded on the metal body.

Preferably, the vehicle door lock further includes a buffer block, where the ratchet wheel is enabled to abut against two ends of the buffer block respectively when the ratchet wheel is in the locked position and the unlocking position.

In one aspect, a method of operating a vehicle door lock of a vehicle door to overcome a frozen state, the method comprising the steps of: positioning a ratchet wheel in a locked position, wherein the ratchet wheel captures a lock catch disposed on a vehicle body when the ratchet wheel is in the locked position, wherein the ratchet wheel is moveable in a forward direction toward the locked position and is biased in a reverse direction toward an unlocking position; moving a ratchet pawl from a ratchet wheel holding positon to a ratchet wheel release position; detecting a stuck condition of the ratchet wheel, wherein the ratchet wheel remains in the locked position in response to moving the ratchet pawl to the ratchet wheel release position; actuating an ice-breaking mechanism disposed inside the vehicle door; applying a torque to the ratchet wheel by the ice-breaking mechanism, wherein the torque rotates the ratchet wheel in the reverse direction to the unlocking position; pushing against the lock catch to open the vehicle door when the ratchet wheel rotates in response to applying the torque.

In one aspect, the ice-breaking mechanism applies the torque to a part of the ratchet wheel other than a rotating shaft of the ratchet wheel.

In one aspect, the ice-breaking mechanism includes an ice-breaking pull cable operatively connected to the ratchet wheel to transmit a pulling force on the ratchet wheel in response to actuation of the ice-breaking mechanism.

In one aspect, the ice-breaking mechanism includes a wheel rod pivotally coaxially coupled to the ratchet wheel and connected to the ice-breaking pull cable, the method further comprising: pulling the wheel rod via the pull cable, rotating the wheel rod by a predetermined angle, abutting the wheel rod against the ratchet wheel when the ratchet wheel is in the locked position, and driving the ratchet wheel to rotate in the reverse direction to the unlocking position when wheel rod rotates past the predetermined angle.

In one aspect, the method includes biasing the ratchet wheel in the unlocking direction via a torsion spring.

In one aspect, the torsion spring is sleeved on the rotating shaft of the ratchet wheel, and two ends of the torsion spring are respectively connected to the ratchet wheel and the wheel rod and configured to reset the wheel rod in the forward direction.

In one aspect, the method includes abutting a cam with the wheel rod, the cam operatively connected to the ratchet wheel to rotate synchronously with the ratchet wheel to rotate the ratchet wheel in response to the wheel rod pushing against the cam.

In one aspect, the method include detecting that the ratchet wheel is in the unlocking position following rotation of the cam and the ratchet wheel and stopping actuation of the ice-breaking mechanism.

In one aspect, the cam includes a metal body formed to include an insertion part coupled to the ratchet wheel and an abutting part disposed in the path of the wheel rod and a plastic body formed to include a cam profile, wherein the plastic body is over-molded on the metal body.

In one aspect, the method includes abutting against a first side of a buffer block with the ratchet wheel when the ratchet wheel is in the locked position and abutting against a second side of the buffer block opposite the first side when the ratchet wheel is in the unlocking position.

The beneficial effects of the present invention are described as follows.

With the vehicle door lock for assisting door opening provided by the present invention, when the vehicle door and the vehicle door lock are frozen by ice or snow due to cold weather, or the vehicle door is stuck due to collision and deformation, the ice-breaking mechanism of the vehicle door lock can apply a torque to the ratchet wheel to enable the ratchet wheel to rotate in the reverse direction, so that during the reverse rotation of the ratchet wheel, a thrust force for pushing against the lock catch toward the interior of the vehicle is formed, to further overcome the vehicle door opening resistance such as the weight of the vehicle door, the internal frozen resistance of the vehicle door lock, the frozen resistance of the vehicle door, and the vehicle body member, and drive the vehicle door to break the ice and open. The above-described ice breaking method opens the frozen vehicle door by way of the transmission chain of the ratchet wheel of the vehicle door lock, to replace the method for realizing the ice breaking and opening of the vehicle door by pushing a vehicle body with an ice-breaking ejector rod disposed on the vehicle door alone. Since all of the operating parts are disposed inside the vehicle door, the noise generated in the ice breaking process is small, and the safety hazard caused by the extending and retraction of the ejector rod at the vehicle door inner panel is eliminated, so that the cost of the ice breaking structure is reduced and the paint surface of the vehicle body will not be damaged.

DETAILED DESCRIPTION

Figure 1A:
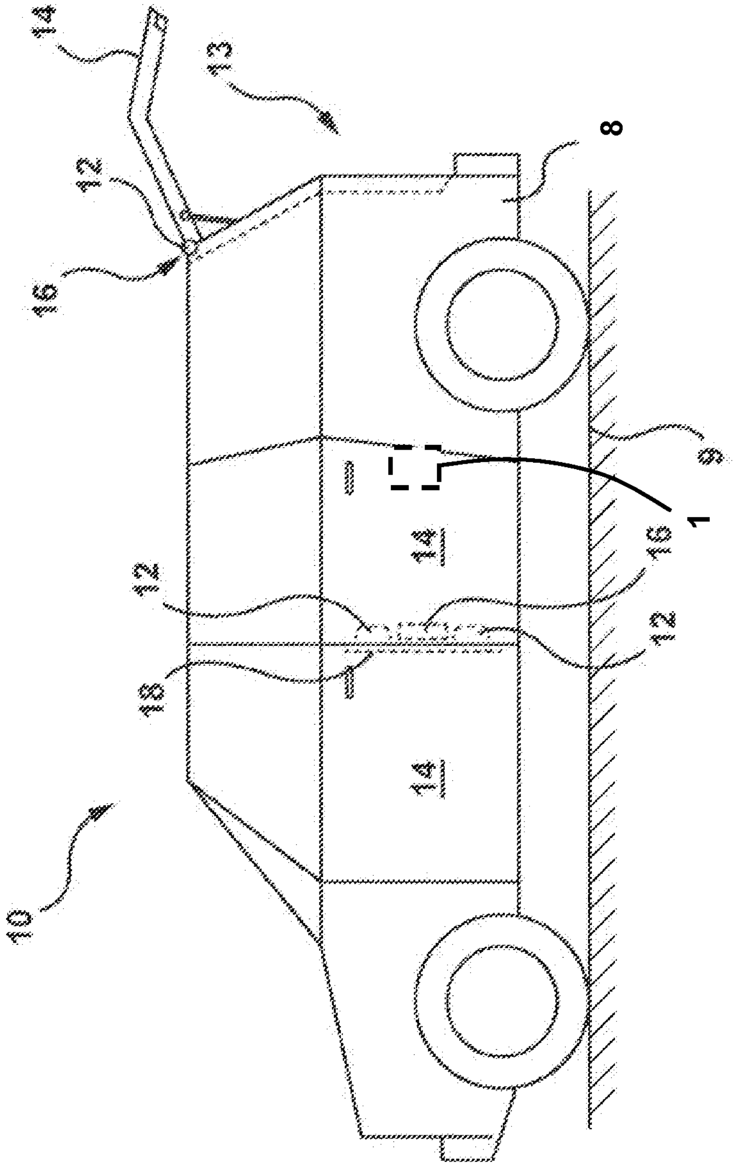
FIG. 1A is a side view of a vehicle with one or more closure panels.

The present invention is further described in detail below in conjunction with the drawings and embodiments. It is to be understood that the embodiments set forth below are intended to illustrate rather than limiting the present invention. In addition, it is to be noted that, for ease of description, only the part of structures, instead of all of the structures, related to the present invention are illustrated in the drawings.

In the description of the present invention, unless otherwise expressly specified and limited, the terms "connected to each other", "connected", or "fixed" are to be construed in a broad sense, for example, as permanently connected, detachably connected, or integrated; mechanically connected or electrically connected; directly connected to each other or indirectly connected to each other via an intermediary; or internally connection of two components or interaction between two components. For those of ordinary skill in the art, specific meanings of the preceding terms in the present invention may be construed based on specific situations.

In the present invention, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of this embodiment, the orientational or positional relationships indicated by terms "above", "below", "right" and the like are based on the orientational or positional relationships shown in the drawings, merely for ease of description and simplifying operation, rather than indicating or implying that the referred device or element must have a specific orientation and is constructed and operated in a specific orientation, and thus they are not to be construed as limiting the present invention. In addition, the terms "first" and "second" are used only to distinguish between descriptions and have no special meaning.

A vehicle door lock capable of assisting door opening is provided according to this embodiment. The vehicle door lock is intended to open a frozen/stuck vehicle door by a transmission chain of a ratchet wheel of a vehicle door lock originally disposed in the vehicle door, to replace the method for realizing the ice breaking and opening of the vehicle door by pushing a vehicle body with an ice-breaking ejector rod disposed on the vehicle door alone, thereby reducing noise generated in the operation of ice breaking and door opening, eliminating a potential safety hazard and reducing the cost of the ice-breaking structure without damaging a paint surface of the vehicle body.

Referring to FIG. 1A, a vehicle 10 is shown, and in one example is provided with a hinge based counterbalance mechanism 16 (e.g. configured using one or more torsion elements that can be used advantageously with vehicle closure panels 14 to provide for open and close operations for the closure panel(s) 14 of vehicles 10. Other applications of the hinge based counterbalance mechanism 16, in general for closure panels 14 both in and outside of vehicle applications, include advantageously assisting in optimization of overall hold and manual effort forces for closure panel 14 operation. It is recognized as well that the hinge based counterbalance mechanism 16 examples provided below can be used advantageously as the sole means of open and close assistance for closure panels 14 or can be used advantageously in combination (e.g. in tandem) with other closure panel 14 biasing members (e.g. spring loaded hinges, biasing struts, etc.). The hinge based counterbalance mechanism 16 can be used to provide or otherwise assist in a holding force (or torque) for the closure panel 14. Further; it is recognized that the hinge based counterbalance mechanism 16 can be integrated in conjunction with hinges 12 of the closure panel 14 such as a component of a closure panel 14 assembly, as further described below.

Referring still to FIG. 1A, shown is the vehicle 10 with a vehicle body 8 having one or more closure panels 14. For vehicles 10, the closure panel 14 can be referred to as a partition or door, typically hinged, but sometimes attached by other mechanisms such as tracks, in front of an opening 13 which is used for entering and exiting the vehicle 10 interior by people and/or cargo. It is also recognized that the closure panel 14 can be used as an access panel for vehicle 10 systems such as engine compartments and also for traditional trunk compartments of automotive type vehicles 10. The closure panel 14 can be opened to provide access to the opening 13, or closed to secure or otherwise restrict access to the opening 13. For example decklids, trunks, hoods, tailgates. Also closure panel 14 can be for a center console with hinged lid configuration, glove compartments, pickup truck covers, windows and the like. It is also recognized that there can be one or more intermediate hold positions of the closure panel 14 between a fully open position and fully closed position, as provided at least in part by a torsion element. For example, the torsion element can assist in biasing movement of the closure panel 14 away from one or more intermediate hold position(s), also known as Third Position Hold(s) (TPHs) or Stop-N-Hold(s), once positioned therein. It is also recognized that the torsion element(s) can be provided as a component of the closure panel 14 assembly.

The closure panel 14 can be opened manually and/or powered electronically via the hinge based counterbalance mechanism 16, where powered closure panels 14 can be found on minivans, high-end cars, or sport utility vehicles (SUVs) and the like. Additionally, one characteristic of the closure panel 14 is that due to the weight of materials used in manufacture of the closure panel 14, some form of force assisted open and close mechanism (or mechanisms) are used to facilitate operation of the open and close operation by an operator (e.g. vehicle driver) of the closure panel 14. The force assisted open and close mechanism(s) can be provided by the torsion element(s), a motor, and/or any biasing members external to the hinge based counterbalance mechanism 16 (e.g. spring loaded hinges, spring loaded struts, gas loaded struts, electromechanical struts, etc.), when used as part of the closure panel 14 assembly. In an embodiment, the torsion element(s) and/or the motor may provide both the force assist and counterbalance for the closure panel 14 assembly.

In terms of vehicles 10, the closure panel 14 may be a lift gate as shown in FIG. 1A, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 8 of the vehicle 10. Canopy doors are a type of door that sits on top of the vehicle 10 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 8 of the vehicle at the front, side or back of the door, as the application permits.

Referring still to FIG. 1A, in the context of a vehicle application of a closure panel by example only, the closure panel 14 is movable between a closed position (shown in dashed outline) and an open position (shown in solid outline). In the embodiment shown, the closure panel 14 pivots between the open position and the closed position about a pivot axis 18, which can be configured as horizontal or otherwise parallel to a support surface 9 of the vehicle 10. In other embodiments, the pivot axis 18 may have some other orientation such as vertical (see FIG. 1A) or otherwise extending at an angle outwards from the support surface 9 of the vehicle 10.

The vehicle door lock further described herein may be used with the above described and illustrated vehicle 10 and associated closure panels 14, or other types of vehicles and closure panels having a striker captured by a rotating ratchet, as further described below. The vehicle door lock may be disposed at a variety of interface locations between the vehicle closure panel 14 and the vehicle body 8. In one aspect, the vehicle door lock housing may be disposed at a rear edge or bottom edge of the closure panel 14 with the corresponding striker disposed on the vehicle body 8 at a corresponding location. The vehicle door lock structure will now be described in further detail below.

Based on the foregoing vehicle door lock structure, and with reference to those shown in FIGS. 1B to 3, the vehicle door lock includes a lock housing 1 fixedly disposed in the vehicle door 14, and parts such as a ratchet wheel 2, a ratchet pawl 3, and a buffer block 4 disposed in the lock housing 1. The lock housing 1 and a vehicle door inner panel each have an avoidance hole 11 that allows the ratchet wheel 2 to engage directly with the lock catch 100 disposed on vehicle body 8. The ratchet wheel 2 is rotatably disposed in the lock housing 1. The buffer block 4, preferably made of a non-rigid material such as rubber, is arranged on a rotation path of the ratchet wheel 2 so that after the ratchet wheel 2 rotates in a forward direction and in a reverse direction, the ratchet wheel 2 can respectively abut against two ends or opposite sides of the buffer block 4, whereby the ratchet wheel 2 obtains two limit positions, one of which is a locked position after the rotation in the forward direction (shown in FIG. 2) and the other of which is an unlocking position after the rotation in the reverse direction (shown in FIG. 1B).

When the ratchet wheel 2 is in the locked position, a ratchet tooth 21 provided on the ratchet wheel 2 can be inserted into a lock hole 101 formed in the striker/lock catch 100 to capture the lock catch 100 and keep the vehicle door 14 in the closed state, and when the ratchet wheel 2 is in the unlocking position, the ratchet tooth 21 moves out of the lock hole 101 to release the lock catch 100 so as to allow the vehicle door to be opened.

Figure 1B:
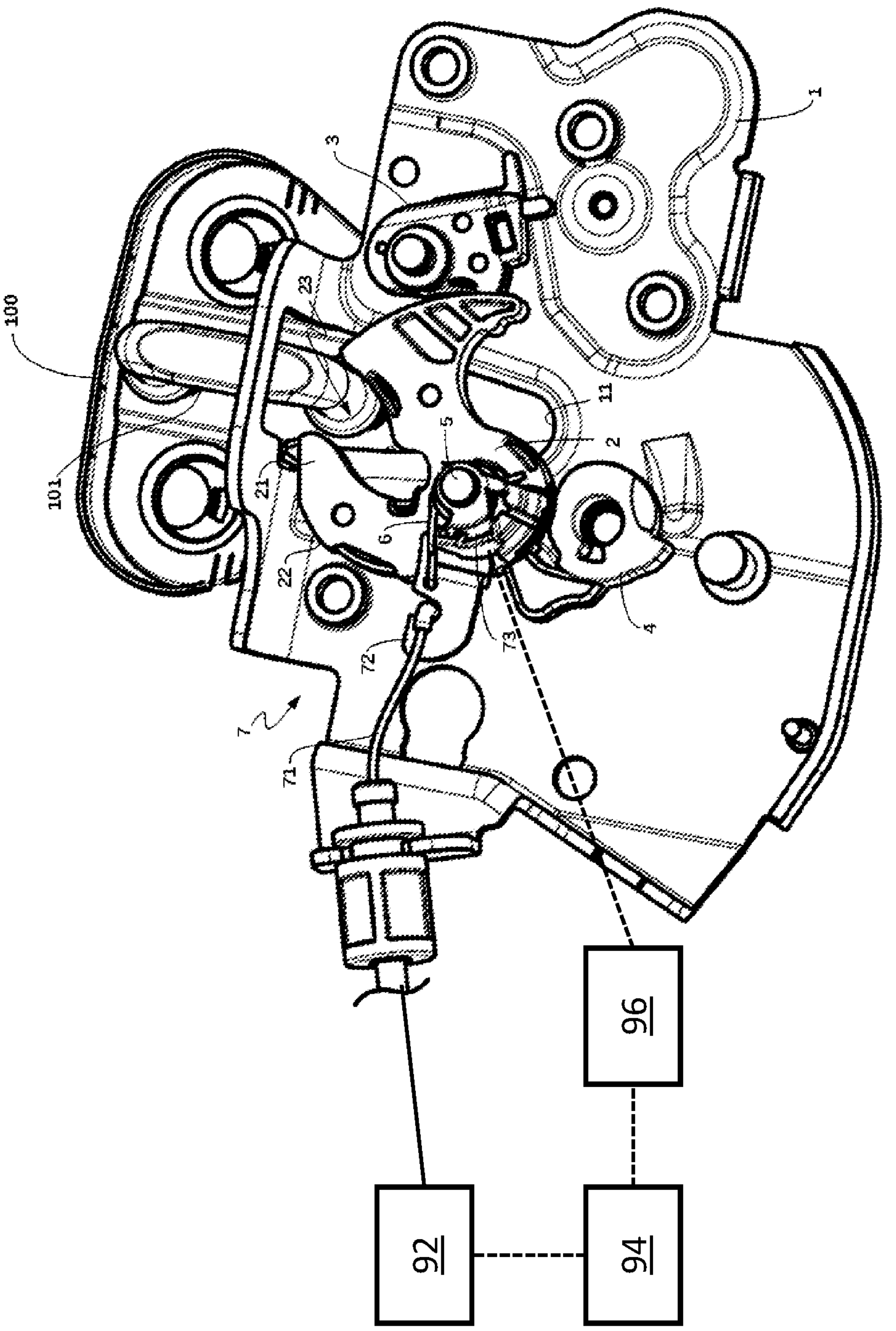
FIG. 1B is a schematic structure view of a vehicle door lock usable with the closure panels and capable of assisting door opening in embodiments of the present invention, with a ratchet wheel shown in an unlocking position.
Figure 2:
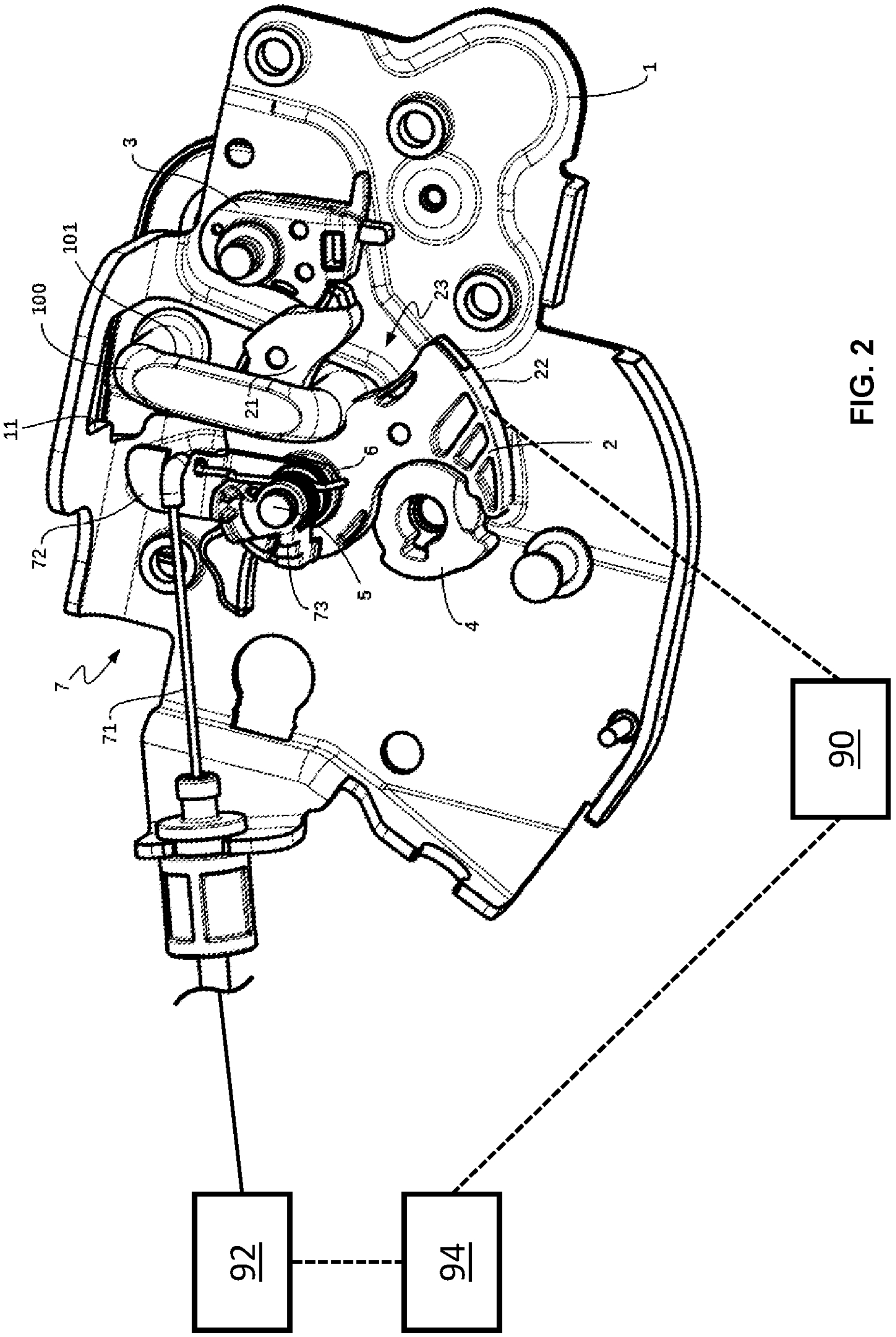
FIG. 2 is a schematic structure view of the vehicle door lock capable of assisting door opening in the embodiments of the present invention, with the ratchet wheel shown in a locked position.

Referring to FIG. 1B and FIG. 2, the ratchet wheel 2 is pivotally coupled to the lock housing 1 in a rotatable manner by a rod pin 5. The ratchet wheel 2 is concavely configured inwards from its rim 22 to form a concave part 23, an inner wall of the concave part 23 is configured to guide the lock catch 100 into the concave part 23 when the ratchet wheel 2 rotates in the forward direction, and to guide the lock catch 100 out of the concave part 23 when the ratchet wheel 2 rotates in the reverse direction.

In other words, when the vehicle door is opened, the ratchet wheel 2 is in an unlocking state as shown in FIG. 1B. In this case, an opening of the concave part 23 is aligned with the avoidance hole 11 and in the process of closing the vehicle door 14, the vehicle door moves toward the vehicle body, and the lock catch 100 moves toward the ratchet wheel 2 to first come into contact with and push against the inner wall of the concave part 23 of the ratchet wheel 2 to drive the ratchet wheel 2 to rotate in the forward direction (clockwise in FIG. 1B), so that the ratchet tooth 21 is gradually inserted into the lock hole 101 of the lock catch 100, and as the ratchet wheel 2 rotates, the lock catch 100 is guided by the inner wall of the concave part 23 to move toward the inside of the ratchet wheel 2, i.e., the side where the rod pin 5 is located. The movement substantially in a radial direction of the ratchet wheel 2 can be understood as adapting to a gradually reduced distance between the lock catch 100 and the ratchet wheel 2 in the process of closing the vehicle door 14 (conversely, it can adapt to a gradually increased distance between the lock catch 100 and the ratchet wheel 2 in the process of opening the vehicle door 14). When the vehicle door 14 is fully closed, the ratchet pawl 3 holds the ratchet wheel 2 in the locked position (shown in FIG. 2), forming the locking of the vehicle door 14.

To open the vehicle door, the above-described structures will perform the actions reversely, which will not be described again. The vehicle door lock generally also includes a torsion spring 6 sleeved on the rod pin 5. The torsion spring 6 acts on the ratchet wheel 2 to accumulate elastic potential energy during the forward rotation of the ratchet wheel 2 during closing movement, and when the ratchet pawl 3 releases the ratchet wheel 2 from the position shown in FIG. 2, the torsion spring 6 provides a restoring elastic force to the ratchet wheel 2 for the ratchet wheel 2 to rotate (counter-clockwise in FIG. 2) to return to the unlocking position shown in FIG. 1. The restoring elastic force that can be provided by the torsion spring 6 is generally set enough to be able to reset the ratchet wheel 2 unloaded to rotate to the unlocking position, so as to avoid uncontrollable large opening of the vehicle door and ensure safety. Therefore, the opening of the vehicle door still relies in part on an occupant to push/pull the vehicle door 14 away from the vehicle body 8, to allow the lock catch 100 to drive, by the guidance of the above inner wall of the concave part 23, the ratchet wheel 2 to rotate reversely until the ratchet tooth 21 of the ratchet wheel 2 is fully moved out of the lock hole 101. After this movement of the ratchet tooth 21, the vehicle door 14 can be fully opened.

In view of the above, when the vehicle door 14 and the vehicle door lock are frozen by ice and snow due to cold weather, or the vehicle door 14 is stuck for being deformed due to collision, the vehicle door 14 can be opened through breaking ice if the ratchet wheel 2 can obtain a torque so as to be enabled to push against the lock catch 100. Therefore, the vehicle door lock in this embodiment further includes an ice-breaking mechanism 7 disposed inside the vehicle door. The ice-breaking mechanism 7 is capable of applying a torque to the ratchet wheel 2 to enable the ratchet wheel 2 to rotate in the reverse direction, so that during the reverse rotation of the ratchet wheel 2, with the guidance of the inner wall profile of the concave part 23, a thrust for pushing against the lock catch 100 toward the interior of the vehicle is formed, to further overcome the vehicle door opening resistance such as the vehicle door weight, the internal frozen state of the vehicle door lock, the frozen state of the vehicle door and the vehicle body member, and the stuck condition of the vehicle door due to the structural deformation, to open the vehicle door.

The above-described ice breaking method is operable to open the frozen/stuck vehicle door 14 by way of the transmission chain of the ratchet wheel 2 (that is, the transmission cooperating relationship between the ratchet wheel 2 and the lock catch 100) of the vehicle door lock, which can replace the method for realizing the ice breaking and opening of the door by pushing a vehicle body with an ice-breaking ejector rod disposed on the vehicle door alone. Because all the operating components of the ice-breaking mechanism 7 are disposed inside the vehicle door 14, the noise generated in the ice breaking process is small, the safety hazard caused by the extension and retraction of the ejector rod at the vehicle door inner panel is eliminated, the cost of the ice-breaking structure is reduced, and the paint surface of the vehicle body 8 will not be damaged.

The operation of ice breaking and opening of the vehicle door can be performed based on the following exemplary control method: a micro switch 90 can be provided inside the vehicle door lock and both the micro switch 90 and an actuator 92 are electrically connected to an onboard control system 94. The micro switch 90 is configured to detect a rotational position of the ratchet wheel 2. When the ratchet pawl 3 releases the ratchet wheel 2 and the onboard control system 94 learns, based on a feedback signal from the micro switch 90, that the ratchet wheel 2 is not rotated, the onboard control system 94 may determine that the vehicle door 14 is blocked from being opened due to a frozen state or the like, and then issue an ice breaking operation instruction to the ice-breaking mechanism 7 and actuator 92. The ice-breaking mechanism 7 then applies a torque to the ratchet wheel 2 to perform the ice-breaking operation to rotate the ratchet wheel 2 and open the vehicle door 14.

Due to the limited thickness of the vehicle door, it is inconvenient to apply the torque for assisting the reverse rotation of the ratchet wheel 2 directly on a rotating shaft of the ratchet wheel 2. Therefore, in this embodiment, the above ice-breaking mechanism 7 is preferably configured to apply a pulling force to a part of the ratchet wheel 2 other than its rotating shaft to form the torque that causes the ratchet wheel 2 to rotate reversely. It is to be appreciated that the pulling force has at least a component of the force in a tangential direction of the ratchet wheel 2.

In order to adapt to the change of the pulling position where the ice-breaking mechanism 7 acts on the ratchet wheel 2 during the rotation of the ratchet wheel 2, the ice-breaking mechanism 7 preferably includes the actuator 92 and an ice-breaking pull cable 71. The actuator may be fixed inside the vehicle door 14, and the ice-breaking pull cable 71 is connected between the ratchet wheel 2 and the actuator. The actuator is capable of drawing or winding the ice-breaking pull cable 71 so that the actuator can pull the ice-breaking pull cable 71 during operation and transmit a pulling force by the ice-breaking pull cable 71 to the ratchet wheel 2, thereby driving the ratchet wheel 2 to rotate in the reverse direction. The actuator may be any type of actuator capable of generating a pulling force on a cable or a similar translational movement on a cable or other linkage, such as a linear actuator, a rotation-translation mechanism, a winding spindle, or the like.

In order to ensure that, during the normal opening and closing of the vehicle door, the actions of the ratchet wheel 2 and other structures does not involve the ice-breaking mechanism 7, that is, to allow the ice breaking action of the ice-breaking mechanism 7 to be independent of the normal opening and closing actions of the vehicle door lock, in this embodiment, the ice-breaking mechanism 7 further includes a wheel rod 72 which is pivotally coaxially coupled to the ratchet wheel 2 (such that an arm/lever shape of the wheel rod pivots about the same axis as the ratchet wheel 2) and connected to the ice-breaking pull cable 71, that is, an intermediate transmission structure is additionally provided between the ice-breaking pull cable 71 and the ratchet wheel 2. When the actuator pulls the wheel rod 72 by way of the ice-breaking pull cable 71, the wheel rod 72, after rotating by a preset angle greater than 0, can abut against the ratchet wheel 2 when the ratchet wheel 2 is in the locked position, so as to drive the ratchet wheel 2 to rotate in the reverse direction (counter-clockwise in FIG. 2) to the unlocking position when the wheel rod 72 is pulled and further rotates.

Specifically, the wheel rod 72 and the ratchet wheel 2 are both pivotally coupled to the rod pin 5 so that each of the wheel rod 72 and the ratchet wheel 2 can rotate about the same rotation axis. When the ratchet wheel 2 rotates between its locked position and unlocking position, the ratchet wheel 2 is not in contact with the wheel rod 72, that is, the ratchet wheel 2 does not drive the wheel rod 72 to rotate, and the wheel rod 72 can just abut against the ratchet wheel 2 after rotating the above-mentioned preset angle in the direction of the reverse rotation of the ratchet wheel 2, and when further rotating in this direction after abutting the ratchet wheel 2, the wheel rod 72 will drive the ratchet wheel 2 to rotate along with it, to perform the ice-breaking operation for opening the vehicle door.

The aforementioned torsion spring 6 for resetting the ratchet wheel 2 and keeping the ratchet wheel 2 in the locked position may be specifically arranged such that two ends of the aforementioned torsion spring 6 are respectively connected to the ratchet wheel 2 and the wheel rod 72 so as to be able to reset the wheel rod 72. This is because the return rotating direction of the ratchet wheel 2 is the "reverse direction" described above, i.e., a counterclockwise direction in FIG. 1B and FIG. 2, and the return rotating direction of the wheel rod 72 is the "forward direction" described above, that is, in a clockwise direction in FIG. 1 and FIG. 2, the reverse restoring forces inherent in two ends of the torsion spring 6 can be correspondingly adapted to resetting the ratchet wheel 2 and resetting the wheel rod 72 separately. In order to adapt to the non-synchronous rotation actions of the ratchet wheel 2 and the wheel rod 72, the ends of the torsion spring 6 may be connected to the ratchet wheel 2 and the wheel rod 72 in a non-rigid fixing manner such as an insertion connection.

It will be appreciated that in order for the ratchet wheel 2 to be pushed against by the wheel rod 72 to rotate, the ratchet wheel 2 has at least one portion protruding from its surface in its axial direction, and the portion is provided on a rotation path of the wheel rod 72 to block the rotation of the wheel rod 72 such that it is driven by the wheel rod 72 in response to rotational movement of the wheel rod 72. The portion may be integrally formed to the ratchet wheel 2, and preferably the portion may be a separate member capable of being assembled with the ratchet wheel 2, that is, another intermediate transmission structure is additionally provided between the ice-breaking pull cable 71 and the ratchet wheel 2 to facilitate the preparation and manufacture of the members.

Figure 3:
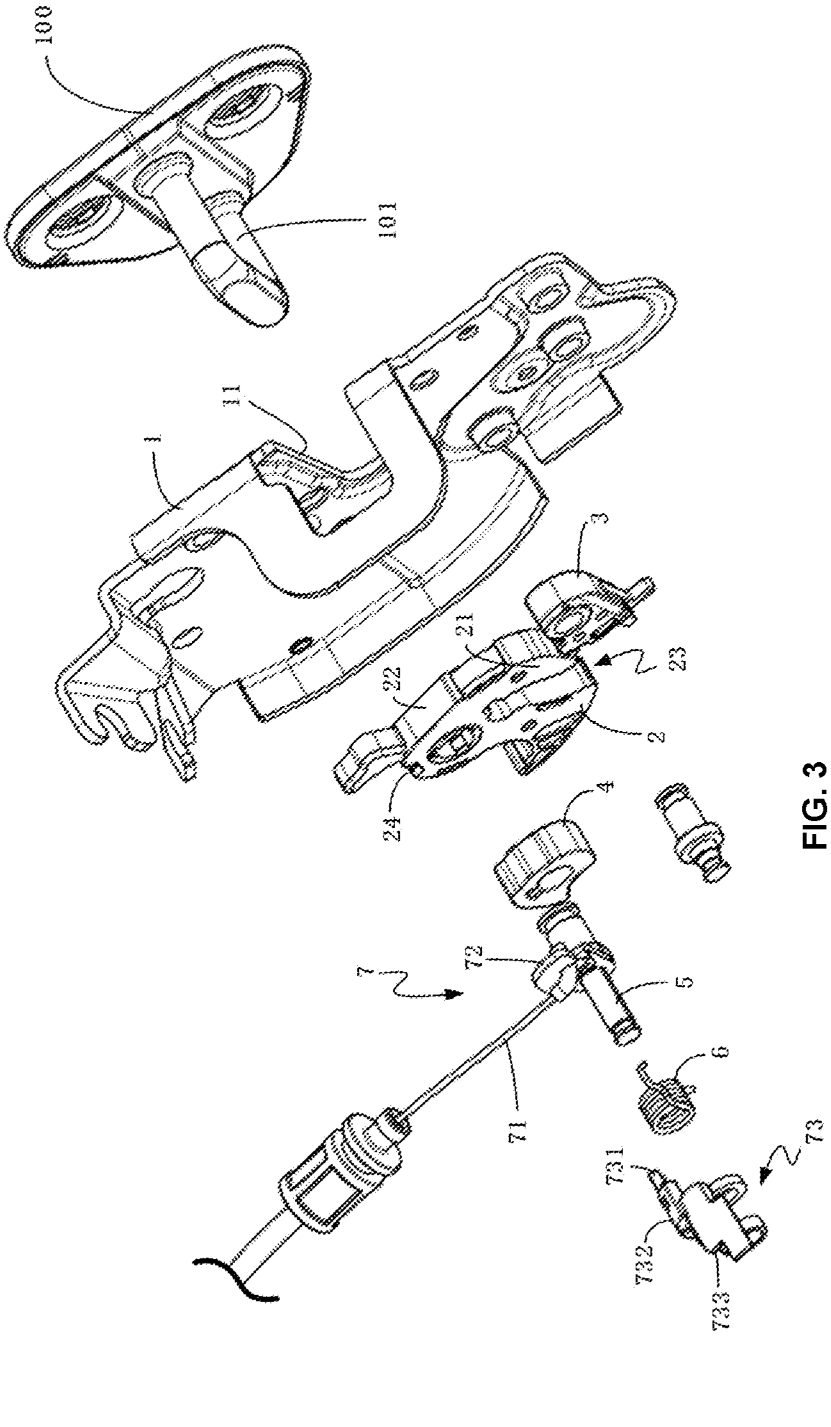
FIG. 3 is an exploded view of the vehicle door lock capable of assisting door opening in the embodiments of the present invention.

As shown in FIG. 1B and FIG. 2, the portion protruding in the axial direction of the ratchet wheel 2 may be a cam 73 pivotally coaxially coupled to the ratchet wheel 2. As shown in FIG. 3, the cam 73 may specifically include an insertion part 731 and an abutting part 732. The insertion part 731 is inserted into and connected to an insertion groove 24 provided in the ratchet wheel 2 so that the cam 73 and the ratchet wheel 2 are connected into one body to rotate synchronously. In one aspect, the insertion groove 74 is dispose don an outer perimeter of the ratchet wheel 2. The abutting part 732 is arranged on a rotation path of the wheel rod 72 to enable the wheel rod 72 to push against the cam 73 to rotate, which causes rotation of the ratchet wheel 2. Each of the wheel rod 72, the cam 73 and the like described above may be made of a metal part such as a steel part to have sufficient structural strength in the ice-breaking operation.

In addition to the aforementioned micro switch 90, in order to facilitate the onboard control system to determine that the ice has been broken and the vehicle door has been opened, another micro switch 96 electrically connected to the onboard control system 94 can be provided in the vehicle door lock. Correspondingly, the cam 73 further includes a cam profile 733 which can trigger the micro switch 94 when the ratchet wheel 2 is in the unlocking position (shown in FIG. 1B). The onboard control system 94 can determine by way of the micro switch 96 that the ratchet wheel 2 rotating synchronously with the cam 73 has been driven by the ice-breaking mechanism 7 to the unlocking position, and may then stop the actuator 92 and reset the actuator 92. At the same time, under the action of the torsion spring 6, the wheel rod 72 can be reset, and the ratchet wheel 2 may remain in the unlocking position.

In order to be adapted to forming the convex profile 733 of a particular shape, to allow the cam 73 to move an appropriate distance relative to the micro switch to trigger the contact of the micro switch, the portion of the cam 73 used to form the convex profile 733 can be made of plastic, that is, the parts of the cam 73 for forming the insertion part 731 and the abutting part 732 may be metal bodies, and the part of the cam 73 for forming the cam profile 733 may be a plastic body. In preparation, a metal body having a regular profile that is easy to be formed can be prepared in advance, and then the metal body may be placed in a mold for molding the plastic body so that the plastic body is overmolded on the metal body. In will be appreciated that, in other optional embodiments, the manufacture of the cam 73 can also be performed by powder metallurgy or other methods to integrally form the cam 73 including the insertion part 731, the abutting part 732, and the cam profile 733, which is not limited herein.

Figure 4:
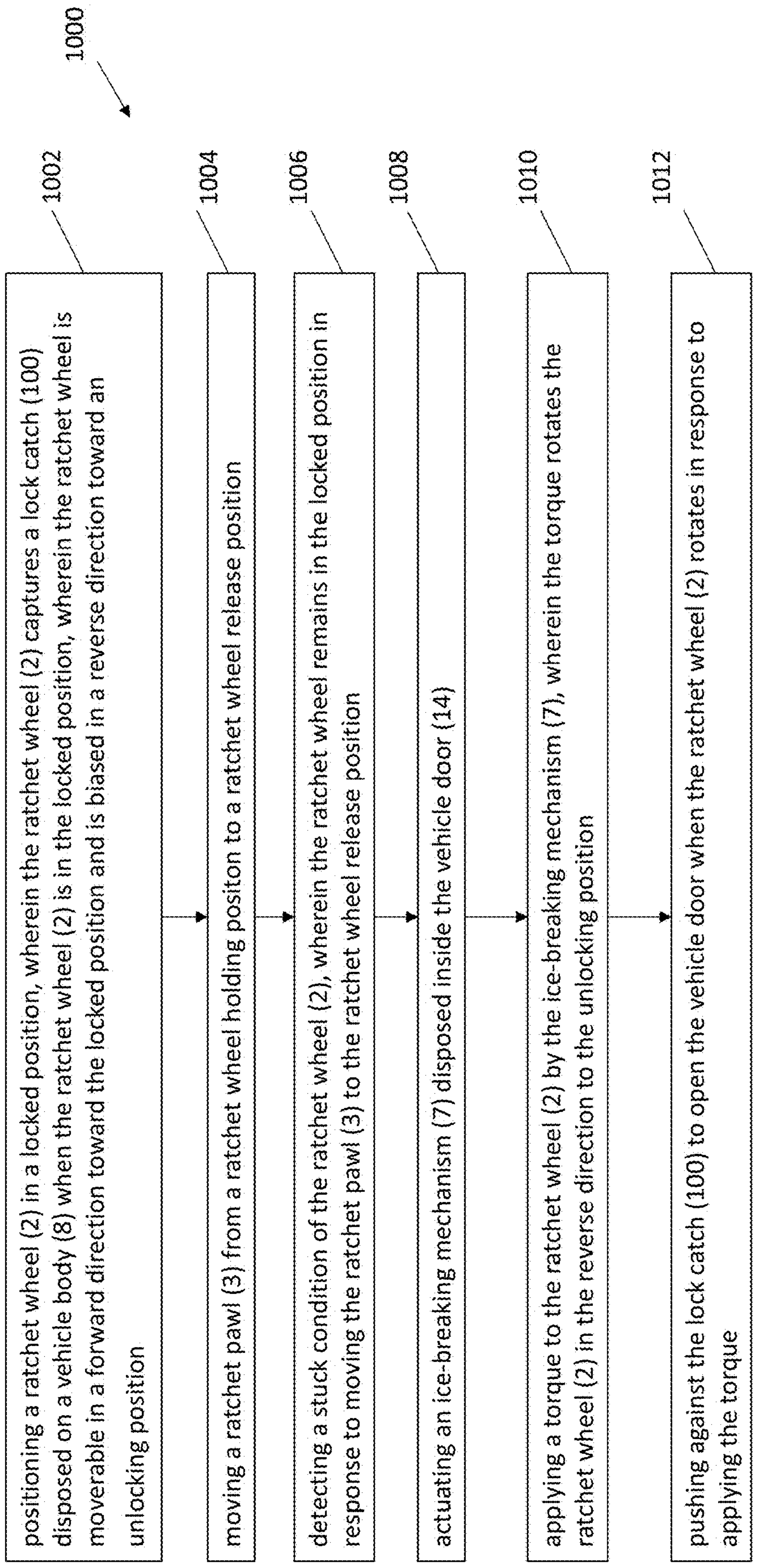
FIG. 4 is a schematic flow chart of a method of the present invention.

In another aspect, illustrated schematically in FIG. 4, a method 1000 of operating a vehicle door lock of a vehicle door 14 to overcome a frozen state is provided, the method comprising the steps of: at step 1002, positioning a ratchet wheel 2 in a locked position, wherein the ratchet wheel 2 captures a lock catch 100 disposed on a vehicle body 8 when the ratchet wheel 2 is in the locked position, wherein the ratchet wheel is moveable in a forward direction toward the locked position and is biased in a reverse direction toward an unlocking position; at step 1004, moving a ratchet pawl 3 from a ratchet wheel holding positon to a ratchet wheel release position; at step 1006, detecting a stuck condition of the ratchet wheel 2, wherein the ratchet wheel remains in the locked position in response to moving the ratchet pawl 3 to the ratchet wheel release position; at step 1008, actuating an ice-breaking mechanism 7 disposed inside the vehicle door 14; at step 1010, applying a torque to the ratchet wheel 2) by the ice-breaking mechanism 7, wherein the torque rotates the ratchet wheel (2) in the reverse direction to the unlocking position; and step 1012 pushing against the lock catch 100 to open the vehicle door when the ratchet wheel 2 rotates in response to applying the torque.

Additional method steps associated with method 1000 will be apparent those skilled in the art in accordance with the above-described structure and operation of the present disclosure.

The above-described embodiments of the present invention are only examples for clearly illustrating the present invention, and are not intended to limit embodiments of the present invention. For those of ordinary skill in the art, various obvious changes, readjustments and substitutions can be made without departing from the protection scope of the present invention. It is not necessary and possible to be exhaustive of all implementations here. Any modification, equivalent replacement and improvement made within the spirit and principle of the present invention shall be included within the protection scope of the claims of the present invention.

What is claimed is:

1. A vehicle door lock capable of assisting door opening, the vehicle door lock configured to be fixed inside a vehicle door (14) of a vehicle, the vehicle door lock comprising:

a ratchet wheel (2), wherein the ratchet wheel (2) is rotatable about a rod pin (5) in a forward direction to be positioned in a locked position and a reverse direction to be positioned in an unlocking position, wherein in the locked position the ratchet wheel (2) captures a lock catch (100) disposed on a vehicle body of the vehicle to close the vehicle door, wherein in the unlocking position the ratchet wheel (2) releases the lock catch (100) to allow the vehicle door to be opened; and an ice-breaking mechanism (7) disposed inside the vehicle door, the ice-breaking mechanism (7) configured to apply a torque to the ratchet wheel (2) to cause the ratchet wheel (2) to rotate in the reverse direction, wherein the ratchet wheel (2) pushes against the lock catch (100) to open the vehicle door when torque is applied to the ratchet wheel (2) by the ice-breaking mechanism (7), wherein the ice-breaking mechanism is also supported for rotation about the rod pin (5);

wherein the ice-breaking mechanism (7) is configured to apply a pulling force to a part of the ratchet wheel (2) other than the rod pin of the ratchet wheel (2) to form the torque that causes the ratchet wheel (2) to rotate in the reverse direction;

wherein the ice-breaking mechanism (7) further comprises:

an actuator (92) fixed to the vehicle door (14);

an ice-breaking pull cable (71) connected between the ratchet wheel (2) and the actuator (92) to transmit a pulling force to the ratchet wheel (2) when the actuator pulls the ice-breaking pull cable (71);

a wheel rod (72) pivotally coaxially coupled to the ratchet wheel (2) and connected to the ice-breaking pull cable (71), the wheel rod (72) configured to be pulled by the ice-breaking pull cable (71), wherein when the actuator pulls the ice-breaking pull cable (71), and the ice-breaking pull cable (71) pulls the wheel rod (72), the wheel rod (72), after rotating by a predetermined angle, abuts against the ratchet wheel (2) when the ratchet wheel (2) is in the locked position and drives the ratchet wheel (2) to rotate in the reverse direction to the unlocking position when wheel rod (72) further rotates;

wherein the vehicle door lock further comprises a torsion spring (6) configured to reset the ratchet wheel (2) toward the unlocking position;

wherein the torsion spring (6) is sleeved on the rotating shaft of the ratchet wheel (2), and two ends of the torsion spring (6) are respectively connected to the ratchet wheel (2) and the wheel rod (72) and configured to reset the wheel rod (72).

2. The vehicle door lock according to claim 1, wherein the ice-breaking mechanism (7) further comprises a cam (73) pivotally coaxially coupled to the ratchet wheel (2), wherein the cam (73) comprises:

an insertion part (731) connected to the ratchet wheel (2) to cause the cam (73) and the ratchet wheel (2) to rotate synchronously; and an abutting part (732) arranged on a rotation path of the wheel rod (72) to cause the wheel rod (72) to push against the cam (73) to rotate the ratchet wheel (2).

3. The vehicle door lock according to claim 2, wherein the cam (73) further comprises a cam profile (733) configured to trigger a micro switch (96) when the ratchet wheel (2) is in the unlocking position, wherein the micro switch (96) is electrically connected to the actuator (92).

4. The vehicle door lock according to claim 3, wherein the cam (73) comprises:

a metal body formed to have the insertion part (731) and the abutting part (732); and a plastic body formed to have the cam profile (733), wherein the plastic body is over-molded on the metal body.

5. The vehicle door lock according to claim 1, further comprising a buffer block (4), wherein the ratchet wheel (2) abuts against opposite sides of the buffer block (4) respectively when the ratchet wheel (2) is in the locked position and the unlocking position.

6. A method of operating a vehicle door lock of a vehicle door (14) to overcome a frozen state, the method comprising the steps of:

positioning a ratchet wheel (2) in a locked position, wherein the ratchet wheel (2) captures a lock catch (100) disposed on a vehicle body (8) when the ratchet wheel (2) is in the locked position, wherein the ratchet wheel is rotatable about a rod pin (5) and is moveable in a forward direction toward the locked position and is biased in a reverse direction toward an unlocking position;

moving a ratchet pawl (3) from a ratchet wheel holding positon to a ratchet wheel release position;

detecting a stuck condition of the ratchet wheel (2), wherein the ratchet wheel remains in the locked position in response to moving the ratchet pawl (3) to the ratchet wheel release position;

actuating an ice-breaking mechanism (7) disposed inside the vehicle door (14);

applying a torque to the ratchet wheel (2) by the ice-breaking mechanism (7), wherein the torque rotates the ratchet wheel (2) in the reverse direction to the unlocking position;

pushing against the lock catch (100) to open the vehicle door when the ratchet wheel (2) rotates in response to applying the torque;

wherein the ice-breaking mechanism is also supported for rotation about the rod pin (5);

wherein the ice-breaking mechanism (7) applies the torque to a part of the ratchet wheel (2) other than the rod pin of the ratchet wheel;

wherein the ice-breaking mechanism includes an ice-breaking pull cable (71) operatively connected to the ratchet wheel to transmit a pulling force on the ratchet wheel (2) in response to actuation of the ice-breaking mechanism;

wherein the ice-breaking mechanism (7) includes a wheel rod (72) pivotally coaxially coupled to the ratchet wheel (2) and connected to the ice-breaking pull cable (71), the method further comprising:

pulling the wheel rod via the ice-breaking pull cable (71), rotating the wheel rod (72) by a predetermined angle, abutting the wheel rod (72) against the ratchet wheel (2) when the ratchet wheel (2) is in the locked position, and driving the ratchet wheel (2) to rotate in the reverse direction to the unlocking position when wheel rod (72) rotates past the predetermined angle;

biasing the ratchet wheel (2) in the reverse direction toward the unlocking position via a torsion spring (6);

wherein the torsion spring (6) is sleeved on the rotating shaft of the ratchet wheel (2), and two ends of the torsion spring (6) are respectively connected to the ratchet wheel (2) and the wheel rod (72) and configured to reset the wheel rod (72) in the forward direction.

7. The method according to claim 6, further comprising abutting a cam (73) with the wheel rod (72), the cam operatively connected to the ratchet wheel (72) to rotate synchronously with the ratchet wheel (72) to rotate the ratchet wheel (72) in response to the wheel rod (72) pushing against the cam (73).

8. The method according to claim 7, further comprising detecting that the ratchet wheel (2) is in the unlocking position following rotation of the cam (73) and the ratchet wheel (2) and stopping actuation of the ice-breaking mechanism (7).

9. The method according to claim 8, wherein the cam (73) includes a metal body formed to include an insertion part (731) coupled to the ratchet wheel (2) and an abutting part (732) disposed in the path of the wheel rod (72) and a plastic body formed to include a cam profile (733), wherein the plastic body is over-molded on the metal body.

10. The method according to claim 6, further comprising abutting against a first side of a buffer block (4) with the ratchet wheel (2) when the ratchet wheel (2) is in the locked position and abutting against a second side of the buffer block opposite the first side when the ratchet wheel (2) is in the unlocking position.

* * * * *